METHOD FOR REDUCING THE IMPURITY RESISTIVITY OF SODIUM
Filed Dec. 29, 1960
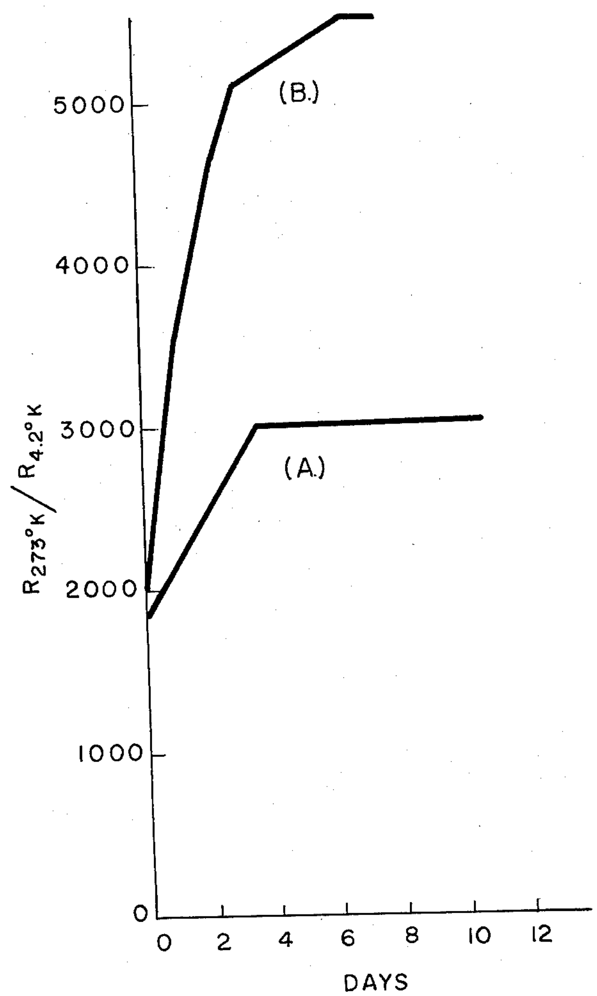
INVENTOR.
RICHARD F. POST
CLYDE E. TAYLOR
BY
Roland A. Anderson
ATTORNEY 3,100,730

METHOD FOR REDUCING THE IMPURITY RESISTIVITY OF SODIUM

Richard F. Post, Walnut Creek, and Clyde E. Taylor, Livermore, Calif., assignors to the United States of America as represented by the United States Atomic Energy Commission Filed Dec. 29, 1960, Ser. No. 79,477
3 Claims. (Cl. 148—13)

The present invention relates to a method for reducing the resistivity of metals at cryogenic temperatures and, more particularly, to a method for reducing the inherent impurity resistivity of a metal, such as sodium, by causing a migratory rearrangement of the impurity atoms therein.

In the course of perfecting magnetic field configurations for the containment of plasmas and study of the effects of instabilities, end losses, and other general behavior therein, a novel system for the more efficient generation of magnetic fields was recently developed. Such system includes cryogenic magnet apparatus wherein a substantial reduction of the resistivity encountered by a current passing through the windings of the magnetic field generating coils, and attendant resistive losses due to such current flow, is effected by maintaining the windings at extremely low temperatures in the region of 30° K. or lower. The magnetic field generating system is disclosed in our co-pending application, Serial No. 862,433, filed December 28, 1959, to Post et al. As disclosed in said application, for optimum magnet efficiency, that is, minimized coil heat losses, the magnet coils should preferably be formed of very pure sodium metal. Such sodium is, for example, cast within a square, thin walled, stainless steel tube, or extruded, and then wound on a suitable coil form. The resulting sodium coil conductor then exhibits an extremely low resistivity when maintained at cryogenic temperatures.

Extremely strong fields of the order of 100,000 gauss are accordingly readily generated by the cryogenic sodium coil with a minimum expenditure of input energy, by virtue of the significant reduction in resistive power losses in the windings at cryogenic temperatures compared to the losses at room temperature. The efficient generation of magnetic fields of such high order is of utmost importance, for example, in plasma confinement (as employed in plasma behavior studies), particle accelerators, bubble chambers, and other applications where strong magnetic fields are required.

At cryogenic temperatures a significant portion of the conductor resistivity is due to the presence of impurity atoms in the conductor lattice structure. Accordingly, very pure sodium metal, or the like, is desired in the coil construction. The provision of highly purified sodium metal in large quantities for forming cryogenic coils is unfortunately a difficult, time consuming, and relatively expensive procedure. We have found, however, that the impurity resistivity of the sodium may be significantly reduced without actual purification of the sodium. More specifically, in accordance with the present invention, there is provided a method for producing large quantities of sodium metal which exhibits the electrical properties of highly purified metal while not being of the purity that results from actual purification processes. In fact, the present method reduces the resistivity of sodium below the values which are attainable with conventional purification methods. Briefly, by the present method, the effective electron collision cross section of the metal is reduced resulting, thereby, in the reduction of the number of collisions that occur between electrons and such lattice imperfections during the flow of current through the conductor. Thus, the resistivity as seen by the electrons is reduced to a value far below that attainable by a method of extreme purification wherein some of the impurity atoms are removed from the metal rather than being merely rearranged therein. It is to be understood that the method of the present invention, although herein described with principal reference to sodium metal, is not limited to use with sodium metal alone, but may be applicable to other metals such as aluminum, copper, etc.

It is therefore, an object of the present invention to provide a simple method for reducing the impurity resistivity of sodium, or other metals, for various practical applications at cryogenic temperatures.

It is another object of the present invention to provide a very low resistivity sodium metal for use in cryogenic magnet coil windings.

It is still another object of the present invention to provide a method for lowering the residual resistivity of a metal by means of impurity atom migration and clustering thereof in the lattice structure of the metal.

Other objects and advantages will be apparent in the following description and claims considered together with the accompanying drawing wherein the single FIGURE is a graph showing the results of the method of the present invention, as applied to several samples of sodium, time being plotted versus a ratio of the resistivity of sodium at 273° K. and 4.2° K.

Various experiments have shown the residual electrical resistivity of sodium at temperatures in a range generally below 10° K. to be independent of changes in temperature and to depend, instead, primarily on the impurities contained in the metal solid solution. The method of the present invention tends to reduce the residual resistivity by effecting a migration of the impurity atoms and clustering thereof in such a manner that the cross section for collisions between electrons and the impurity imperfections in the lattice is significantly reduced. Briefly, the beneficial impurity atom migration is effected by heating the sodium to a temperature a few degrees below its melting point and maintaining this temperature for an extended period of time. After several days at this temperature, the sodium's resistance, as subsequently measured at liquid helium temperature, is observed to asymptotically approach a value which may be as much as a factor of 3 lower than the resistance of the sodium measured at the same temperature before heating. The resistivity decrease is most pronounced for the purest samples of sodium and for those having a relatively large cross section, suggesting, therefore, that size has some effect on the results obtained. Since sodium is fully annealed at temperatures below room temperature, and since the mean impurity content of encapsulated samples is clearly constant, the effects observed arise from impurity atom migration and clustering, possibly associated with crystal growth in the sample. The exact theory underlying the effects set forth in the method of the disclosed invention are not fully evident at the present time, but have been repeated time and again in various experiments and are, therefore, predictable.

In the accomplishment of the foregoing general procedure, a relatively pure sodium metal is preferably first cast into either a small stainless steel tube, as in experimental studies, or in tubular stainless steel helical supporting coils such as used in an actual cryogenic magnet. The cast sodium-containing tube or coil is next placed in a heat bath wherein such bath is maintained at a temperature slightly below the melting point of the sodium (97° C.) and, preferably, of the order of 90° C. The heat bath may be any fluid which exhibits the property of a low vapor pressure at the treating temperature employed in the method, and is preferably a hydrocarbon oil such as kerosene. The encapsulated sodium is kept in the bath for a period of time such as, for example, three or four days. Upon removal of the capsule or sodium-containing coil form from the bath, it will be found that its resistivity has been materially reduced.

Although the exact theory underlying the effects observed is not completely known at this time, the effects have proved repetitious in a number of experiments. As examples of the resistivity lowering effects of the present method, the ratios of resistivity at 273° K. compared to resistivity at 4.2° K., $R_{273° K.}/R_{4.2° K.}$, are plotted with respect to time in FIGURE 1 for two samples of sodium metal of different purities, encapsulated within separate tubes. In the figure, curve A depicts the resistivity ratio for a sodium sample of relatively low purity, whereas curve B is a plot of the ratio obtained from a more highly purified sodium sample. The curves were obtained by removing the test samples from the heat bath at predetermined time intervals and measuring the resistivity thereof at 4.2° K. The resulting resistivity values were then compared to the resistivity of the sample as measured at 273° K. The resulting ratios ($R_{273° K.}/R_{4.2° K.}$) were plotted versus the time intervals of the respective resistivity measurement. It should be noted that curve A depicts a sudden lowering of resistivity during the initial period of immersion in the heat bath, with a rather constant resistivity thereafter, viz., after approximately three days. Moreover, the resistivity of the sample after this time is lowered by a factor of about 1.5 compared to the resistivity value taken before applying the method. The resistivity changes of the higher purity sodium sample, as depicted by curve B, show the rather constant resistivity value appearing after about six days of immersion in the heat bath. The sodium sample of curve B shows a residual resistivity decrease on the order of a factor of 3 with overall values of residual resistivity thereof being lower than the overall values of the less purified sample of curve A. Thus, as seen from the figure, the method of the present invention provides a lower residual resistivity effect in a relatively purer sample of sodium. The method of the present invention, therefore, is preferably utilized with relatively pure samples of the metal since pure samples give optimum resistivity results. It is to be understood that the curves A and B are for purposes of illustrating the method of the present invention. The amount of resistivity change and final resistivity attained by other samples may vary substantially. However, it has generally been found that the residual resistivity approaches the low constant value in the time range of from 2 to 6 days.

While the invention has been disclosed herein with respect to a single preferred embodiment, it will be apparent that numerous variations and modifications may be made within the spirit and scope of the invention and, thus, it is not intended to limit the invention except by the terms of the following claims.

What is claimed is:

1. A method for reducing the resistivity of sodium for use at cryogenic temperatures comprising the steps of encapsulating said sodium within an enclosure, placing said enclosure and cast sodium in a heat bath, maintaining said heat bath at controlled temperatures slightly below the melting point temperature of said sodium, and maintaining the enclosure and cast sodium within said bath for a period of at least two days.

2. A method for reducing the residual resistivity of sodium for use at cryogenic temperatures comprising the steps of encapsulating said sodium in an enclosure, placing said enclosure and cast sodium in a heat bath, maintaining said heat bath at a temperature of approximately 90° C., and retaining said enclosure and cast sodium in said heat bath for a period of time ranging from two to six days.

3. A method for enhancing the conductivity of sodium comprising placing said sodium in a heat bath, maintaining said heat bath at a controlled temperature slightly below the melting point of sodium, maintaining the sodium within said bath for a period of at least two days, cooling said sodium to temperatures approaching 0° K., and passing an electric current through said sodium to realize said enhanced conductivity.

References Cited in the file of this patent

UNITED STATES PATENTS

| | | |
|---|---|---|
| 2,576,679 | Guillaud | Nov. 27, 1951 |
| 2,864,729 | Seiler | Dec. 16, 1958 |

OTHER REFERENCES

Guy: Elements of Physical Metallurgy, pages 136–139, 1951.

Metals Handbook, 8th Edition, pp. 2 and 18, 1961.

Progress in Metal Physics, pages 55–72, vol. 3, Chalmers and King, 1951.

Progress in Metal Physics, pages 377–385, vol. 7, Chalmers and King, 1948.

Seitz: Physics of Metals, pages 312–321, 1943.

Solid State Physics, pages 302–306, 316–328, vol. 4, Academic Press, 1957.

The Philosophical Magazine, pages 312–315, vol. 4, March 1959.